(12) United States Patent
Yamaguchi et al.

(10) Patent No.: US 9,838,381 B2
(45) Date of Patent: Dec. 5, 2017

(54) CERTIFICATE MANAGEMENT APPARATUS AND CERTIFICATE MANAGEMENT METHOD

(71) Applicant: MITSUBISHI ELECTRIC CORPORATION, Tokyo (JP)

(72) Inventors: Teruyoshi Yamaguchi, Tokyo (JP); Nobuhiro Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/118,415

(22) PCT Filed: Feb. 26, 2014

(86) PCT No.: PCT/JP2014/000998
§ 371 (c)(1),
(2) Date: Aug. 11, 2016

(87) PCT Pub. No.: WO2015/128895
PCT Pub. Date: Sep. 3, 2015

(65) Prior Publication Data
US 2017/0187706 A1    Jun. 29, 2017

(51) Int. Cl.
*H04L 9/00*    (2006.01)
*H04L 29/06*   (2006.01)
*G06F 12/0813* (2016.01)

(52) U.S. Cl.
CPC ...... *H04L 63/0823* (2013.01); *G06F 12/0813* (2013.01); *H04L 63/0853* (2013.01);
(Continued)

(58) Field of Classification Search
CPC ............ H04L 63/0823; H04L 63/0853; H04L 9/3263; H04L 9/3268; G06F 12/0813;
(Continued)

(56) References Cited

U.S. PATENT DOCUMENTS 5,748,960 A *  5/1998  Fischer ................. G06F 9/4428
                                                        719/316
5,943,658 A *  8/1999  Gravell ............ G07B 17/00024
                                                        235/385
(Continued)

FOREIGN PATENT DOCUMENTS

EP          1762964 A1 *  3/2007  ............. G06Q 10/10
JP          03-232036 A    10/1991
(Continued)

OTHER PUBLICATIONS

Raya, "The Security of Vehicular Ad Hoc Networks", SASN'05, Nov. 5, 2005, Alexandria, Virginia, pp. 11-21.*
(Continued)

*Primary Examiner* — Luu Pham
*Assistant Examiner* — Walter Malinowski
(74) *Attorney, Agent, or Firm* — Birch, Stewart, Kolasch & Birch, LLP

(57) ABSTRACT

A certificate management apparatus retains an important certificate, while deleting the oldest referenced certificate. An update determination information output unit outputs update determination information being information for determining whether or not to update a certificate. A certificate cache stores the certificate on a volatile memory. An operation unit stores the update determination information output by the update determination information output unit in the certificate cache by relating to the certificate, and based on the update determination information stored in the certificate cache, updates the certificate related to the update determination information.

10 Claims, 13 Drawing Sheets

(52) U.S. Cl.
CPC .... *G06F 2212/154* (2013.01); *G06F 2212/60* (2013.01); *G06F 2212/62* (2013.01)

(58) Field of Classification Search
CPC ........... G06F 2212/154; G06F 2212/60; G06F 2212/62
USPC ............................. 726/2, 7, 10; 713/156, 175
See application file for complete search history.

(56) References Cited

U.S. PATENT DOCUMENTS

| | | | | |
|---|---|---|---|---|
| 5,982,898 | A * | 11/1999 | Hsu | H04L 9/321 713/156 |
| 6,230,272 | B1 * | 5/2001 | Lockhart | G06F 21/62 726/2 |
| 6,321,333 | B1 * | 11/2001 | Murray | H04L 9/3265 713/156 |
| 6,414,635 | B1 * | 7/2002 | Stewart | G01S 5/12 342/457 |
| 6,636,975 | B1 * | 10/2003 | Khidekel | G06F 21/32 713/156 |
| 6,754,661 | B1 * | 6/2004 | Hallin | G06F 21/33 707/797 |
| 7,712,126 | B2 * | 5/2010 | Andersson | G06F 21/53 713/155 |
| 7,721,108 | B2 | 5/2010 | Pailles et al. | |
| 7,743,248 | B2 * | 6/2010 | Bisbee | G06Q 20/00 713/156 |
| 7,953,977 | B2 | 5/2011 | Maruyama et al. | |
| 8,060,915 | B2 | 11/2011 | Voice et al. | |
| 8,230,486 | B2 | 7/2012 | Voice | |
| 8,380,985 | B2 | 2/2013 | Sato et al. | |
| 8,402,198 | B1 | 3/2013 | de la Iglesia et al. | |
| 8,452,954 | B2 * | 5/2013 | Strong | G06F 21/445 713/151 |
| 8,612,757 | B2 | 12/2013 | Chiviendacz et al. | |
| 8,788,811 | B2 * | 7/2014 | Fu | H04L 9/0825 380/277 |
| 8,874,903 | B2 | 10/2014 | Kudo | |
| 8,966,579 | B2 | 2/2015 | Mister et al. | |
| 9,037,852 | B2 * | 5/2015 | Pinkus | 713/160 |
| 9,100,194 | B2 | 8/2015 | Mister et al. | |
| 9,191,215 | B2 | 11/2015 | Chiviendacz et al. | |
| 9,281,945 | B2 | 3/2016 | Voice et al. | |
| 2002/0007346 | A1 * | 1/2002 | Qiu | G06F 21/33 705/50 |
| 2002/0056747 | A1 * | 5/2002 | Matsuyama | G07C 9/00039 235/382 |
| 2002/0184508 | A1 * | 12/2002 | Bialick | G06F 21/10 713/182 |
| 2003/0014638 | A1 * | 1/2003 | Lincoln | G06Q 20/108 713/178 |
| 2003/0105399 | A1 * | 6/2003 | Morsy | A61B 8/00 600/437 |
| 2003/0132285 | A1 * | 7/2003 | Blancas | G06Q 20/02 235/380 |
| 2003/0154406 | A1 * | 8/2003 | Honarvar | G06Q 10/10 726/10 |
| 2004/0039911 | A1 * | 2/2004 | Oka | G06Q 30/06 713/175 |
| 2004/0064334 | A1 * | 4/2004 | Nye | G06F 17/30241 705/317 |
| 2004/0093493 | A1 * | 5/2004 | Bisbee | G06Q 20/00 713/156 |
| 2004/0253943 | A1 * | 12/2004 | Suzuki | H04M 1/72522 455/411 |
| 2005/0069136 | A1 * | 3/2005 | Thornton | H04L 63/0823 380/277 |
| 2005/0076199 | A1 * | 4/2005 | Thornton | H04L 63/0823 713/156 |
| 2005/0081037 | A1 * | 4/2005 | Kumagai | H04L 9/3268 713/175 |
| 2005/0144449 | A1 | 6/2005 | Voice | |
| 2005/0144450 | A1 | 6/2005 | Voice | |
| 2005/0144451 | A1 | 6/2005 | Voice et al. | |
| 2005/0149761 | A1 | 7/2005 | Chiviendacz et al. | |
| 2005/0154877 | A1 * | 7/2005 | Trench | G06Q 20/02 713/156 |
| 2005/0204164 | A1 * | 9/2005 | Kakii | H04L 9/3268 726/5 |
| 2006/0015725 | A1 | 1/2006 | Voice et al. | |
| 2006/0036849 | A1 * | 2/2006 | Brown | H04L 9/3265 713/156 |
| 2006/0047949 | A1 * | 3/2006 | Brown | H04L 9/3265 713/156 |
| 2006/0075221 | A1 * | 4/2006 | Moore | H04L 63/0823 713/156 |
| 2006/0156385 | A1 | 7/2006 | Chiviendacz et al. | |
| 2006/0165386 | A1 * | 7/2006 | Garoutte | G08B 13/19604 386/210 |
| 2006/0168447 | A1 * | 7/2006 | Pailles | G06Q 20/045 713/176 |
| 2006/0174323 | A1 * | 8/2006 | Brown | H04L 63/0428 726/3 |
| 2007/0005967 | A1 | 1/2007 | Mister et al. | |
| 2007/0022469 | A1 * | 1/2007 | Cooper | H04K 1/00 726/3 |
| 2007/0113071 | A1 | 5/2007 | Lindinger et al. | |
| 2007/0118735 | A1 * | 5/2007 | Cherrington | G06F 21/602 713/155 |
| 2007/0143596 | A1 * | 6/2007 | Myers | H04L 63/0442 713/156 |
| 2007/0208943 | A1 * | 9/2007 | Gupta | G06F 21/64 713/176 |
| 2007/0244817 | A1 * | 10/2007 | Dolivo | G06Q 10/087 705/50 |
| 2008/0034440 | A1 * | 2/2008 | Holtzman | G06F 21/10 726/27 |
| 2008/0222418 | A1 * | 9/2008 | Futa | H04L 9/3263 713/176 |
| 2009/0132813 | A1 * | 5/2009 | Schibuk | G06Q 20/223 713/158 |
| 2009/0235071 | A1 | 9/2009 | Bellur et al. | |
| 2010/0031028 | A1 * | 2/2010 | Adams | H04L 9/3263 713/156 |
| 2010/0058058 | A1 * | 3/2010 | Busari | G06F 21/445 713/169 |
| 2010/0115268 | A1 | 5/2010 | Kudo | |
| 2010/0146614 | A1 * | 6/2010 | Savoor | H04L 63/0823 726/10 |
| 2010/0185845 | A1 * | 7/2010 | Takayama | G06F 21/575 713/2 |
| 2010/0268942 | A1 * | 10/2010 | Hernandez-Ardieta | H04L 9/006 713/156 |
| 2011/0004763 | A1 * | 1/2011 | Sato | H04L 63/06 713/175 |
| 2011/0119379 | A1 * | 5/2011 | McCormack | G06F 17/30241 709/225 |
| 2011/0191581 | A1 * | 8/2011 | Shim | H04L 67/12 713/158 |
| 2011/0213967 | A1 * | 9/2011 | Wnuk | H04L 63/0823 713/158 |
| 2011/0231662 | A1 * | 9/2011 | Sato | H04L 9/3268 713/176 |
| 2011/0296190 | A1 * | 12/2011 | Paeschke | B60R 13/10 713/176 |
| 2012/0006899 | A1 | 1/2012 | Voice et al. | |
| 2012/0159156 | A1 * | 6/2012 | Barham | G06F 21/6218 713/156 |
| 2012/0166796 | A1 * | 6/2012 | Metke | H04L 9/321 713/158 |
| 2013/0080780 | A1 | 3/2013 | Mister et al. | |
| 2013/0263211 | A1 * | 10/2013 | Neuman | H04L 63/08 726/1 |
| 2013/0321846 | A1 * | 12/2013 | Hiroshige | G06K 15/408 358/1.14 |
| 2014/0230040 | A1 * | 8/2014 | Crowther | H04W 4/021 726/10 |

(56) References Cited

U.S. PATENT DOCUMENTS

| | | | | |
|---|---|---|---|---|
| 2014/0282869 A1* | 9/2014 | Dabbiere | ............... | H04L 63/10 726/3 |
| 2014/0283054 A1* | 9/2014 | Janjua | ............... | H04L 63/1408 726/23 |
| 2014/0303837 A1* | 10/2014 | Tuukkanen | ............ | G06Q 10/02 701/36 |
| 2014/0359280 A1* | 12/2014 | Saboor | ............... | H04L 63/0823 713/156 |
| 2014/0359281 A1* | 12/2014 | Saboori | .............. | H04L 63/0823 713/156 |

FOREIGN PATENT DOCUMENTS

| | | | |
|---|---|---|---|
| JP | 09016440 A | * | 1/1997 |
| JP | 2002-108209 A | | 4/2002 |
| JP | 2002-163395 A | | 6/2002 |
| JP | 2003-152718 A | | 5/2003 |
| JP | 2005-529547 A | | 9/2005 |
| JP | 2007-88737 A | | 4/2007 |
| JP | 2009-510567 A | | 3/2009 |
| JP | 2009067498 A | * | 4/2009 |
| JP | 2010-108396 A | | 5/2010 |
| JP | 4-149676 A | | 1/2011 |
| JP | 2011-15110 A | | 1/2011 |
| JP | 4624099 B2 | | 2/2011 |
| JP | 2011-81703 A | | 4/2011 |
| KR | 20010038208 A | * | 5/2001 |
| WO | WO 2011/049429 A1 | | 4/2011 |

OTHER PUBLICATIONS

White, "Privacy and Scalability Analysis of Vehicular Combinatorial Certificate Schemes", IEEE, 2009, 5 pages.*

Lin, "Security iin Vehicular Ad Hoc Networks", IEEE Communication Magazine, Seuciryt in Mobile Ad Hoc and Sensor Networks, Apr. 2008, pp. 88-95.*

Jabri, "Authorization within Grid-Computing Using Certificateless Identity-Based Proxy Signature", HPDC'10, Jun. 20-25, 2010, pp. 292-295.*

IEEE Std 1609.2TM-2006: IEEE Trial-Use Standard for Wireless Access in Vehicular Environments—Security Services for Applications and Management Messages, 2006, IEEE Standards Association, DOI:10.1109/IEEESTD.2006.243731; URL http://ieeexplore.ieee.org/document/1653011/ (called up on the internet on Apr. 20, 2017).

* cited by examiner

CERTIFICATE MANAGEMENT APPARATUS AND CERTIFICATE MANAGEMENT METHOD

TECHNICAL FIELD

The present invention relates to a certificate management apparatus verifying a message and a certificate using a digital certificate.

BACKGROUND ART

Conventionally, for instance, in an automobile, a system providing a driver with traffic congestion information, through radio communication which is carried out between a communication apparatus to be mounted on the automobile (hereinafter, referred to as an on-board device) and a communication apparatus to be set on a road (hereinafter, referred to as a roadside device) is used. Further, a system has been studied, in which driving support or automatic driving is carried out while on-board devices mutually perform radio communication. Since human lives are involved in these systems, the confidentiality or the integrity is required for the message to be transmitted.

In order to guarantee the confidentiality or the integrity, the communication apparatus mounts a digital certificate (EE (End Entity) certificate), and for data such as a message to be transmitted, puts a signature on the data or makes the data confidential. Since the digital certificate is issued for each communication apparatus, the communication apparatus transmits the message by appending its own certificate. The communication apparatus which has received the message verifies whether or not the received digital certificate is a digital certificate issued by a predetermined certification authority using a digital certificate (CA (Certification Authority) certificate) of the certification authority, and verifies the signature of the message using the EE certificate which has passed the verification. Hereinafter, the digital certificate is simply referred to as a certificate.

Generally, in a system carrying out driving support or automatic driving, it is required to process 2000 to 4000 messages per second; and it takes a large amount of time to verify the signatures. Therefore, a method is proposed, in which a certificate that has been verified once is stored in a cache, thereby eliminating the subsequent signature verification.

However, generally, since the size of the cache is limited, it is impossible to store certificates exceeding the upper limit of the cache size. For this problem, an apparatus is proposed, which overwrites a part of the cache to store certificates (for instance, Patent Literature 1). Further, for general data, an apparatus which overwrites the cache is proposed (for instance, Patent Literature 2).

CITATION LIST

Patent Literature

Patent Literature 1: JP 4624099B2
Patent Literature 2: JP H04-149676A

SUMMARY OF INVENTION

Technical Problem

According to Patent Literature 1, in order to compress memory quantity to store certificates, a certificate table to record a digest of a public key is retained. It is described that the certificate table stores a hash of the public key, an expiration date, a pointer to the upper certificate, and a counter to be used, and when a certain certificate is referenced, the counter of the certificate and the counter of the upper certificate are each incremented by one. However, in this case, the certificate to which the reference is made frequently is retained preferentially. In the system carrying out the driving support or the automatic driving, since the certificate which has been referenced lately has to be retained preferentially, the above method is not suitable for the system.

On the other hand, according to Patent Literature 2, it is described that since the oldest searched data is automatically deleted, the contents of auxiliary data corresponding to the registered or searched data is rewritten by a value of a counter which is retained inside. However, in a case where this method is applied without change, there is a possibility to delete the CA certificate which has to be retained even if the referenced date and time is old.

The present invention is done to solve the above problems, and provides a certificate management apparatus which retains an important certificate, while deleting the oldest referenced certificate.

Solution to Problem

In order to solve the above-discussed problems, a certificate management apparatus of the present invention includes: an update determination information output unit to output update determination information being information for determining whether or not to update a certificate; a certificate cache being a cache memory to store the certificate on a volatile memory; and an operation unit to store the update determination information output by the update determination information output unit by relating to the certificate in the certificate cache, and based on the update determination information stored in the certificate cache, to update the certificate related to the update determination information.

Advantageous Effects of Invention

According to the present invention, update determination information being information for determining whether or not to update a certificate is stored by relating to the certificate, and a priority to update the certificate is decided using the update determination information, and thereby an effect that enables to retain an important certificate, while deleting the oldest referenced certificate, is obtained.

DESCRIPTION OF EMBODIMENTS

Embodiment 1

In a first embodiment, an embodiment will be explained, in which a value of an internal counter is used as update determination information being information for determining whether or not to update a certificate.

Figure 1:
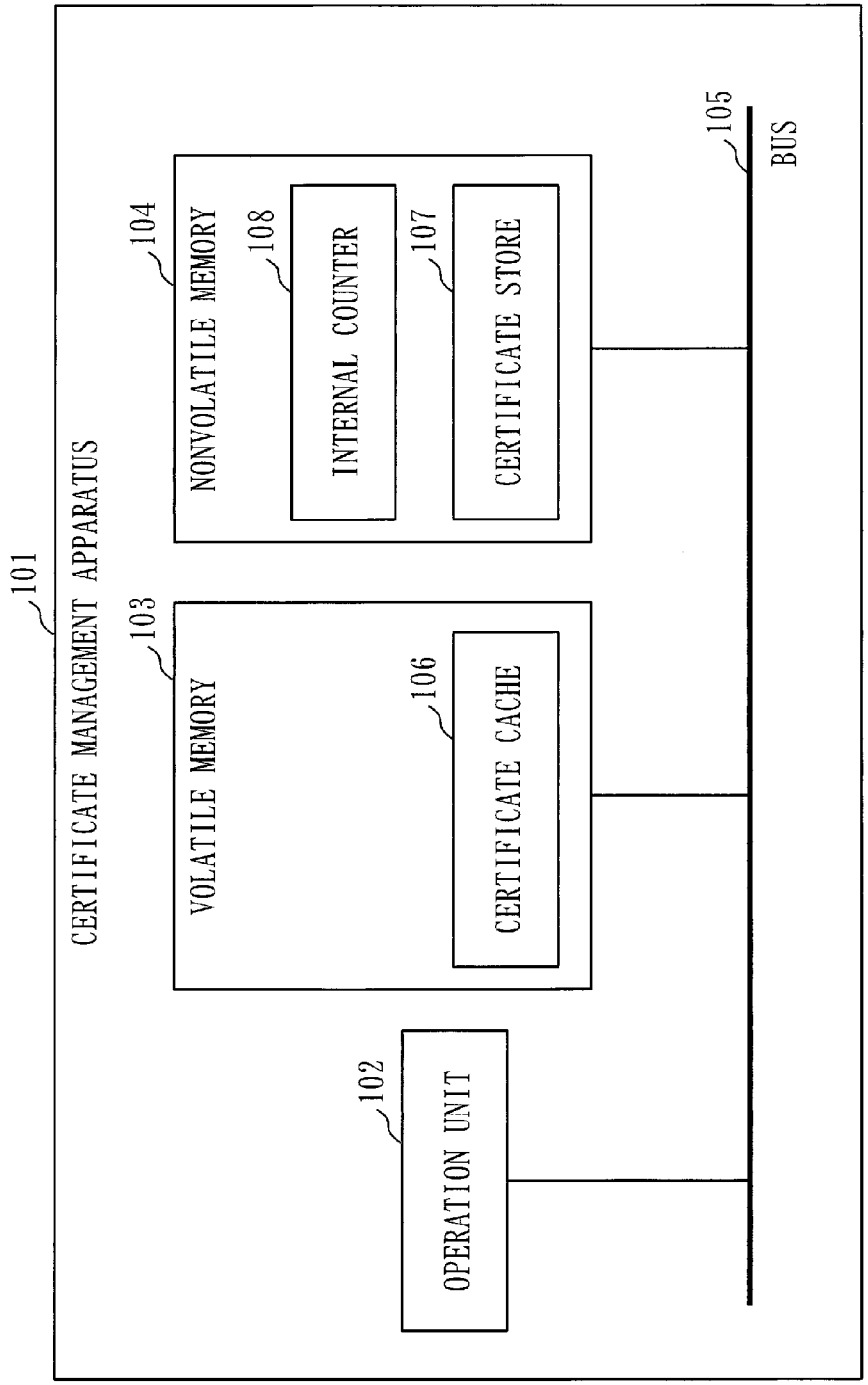
FIG. 1 is a configuration diagram illustrating a configuration example of a certificate management apparatus according to a first embodiment.

FIG. 1 is a configuration diagram illustrating a configuration example of a certificate management apparatus according to the first embodiment.

In FIG. 1, a certificate management apparatus 101 is configured by an operation unit 102, a volatile memory 103, and a nonvolatile memory 104, each connected by a bus 105. The volatile memory 103 is a memory having a small capacity and being volatile, but is capable to be accessed with a high speed; the nonvolatile memory 104 is a memory having a large capacity and low-speed, but is nonvolatile. The volatile memory 103 stores a certificate cache 106. The nonvolatile memory 104 stores a certificate store 107 and an internal counter 108. The certificate store 107 is an example of a certificate memory unit. Further, the internal counter 108 is an example of an update determination information output unit.

Figure 2:
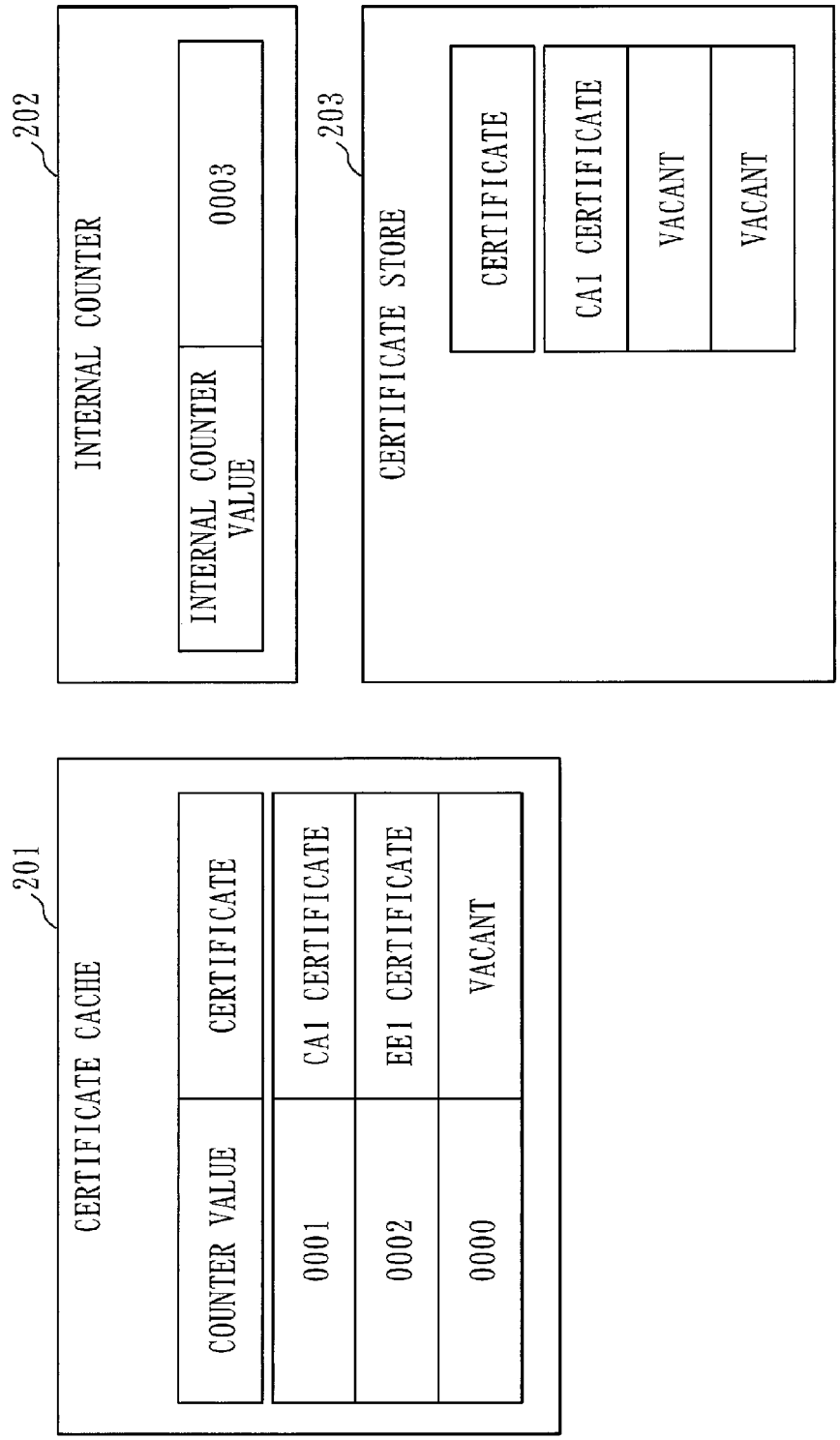
FIG. 2 is a configuration diagram illustrating a configuration example of a certificate cache, a certificate store, and an internal counter.

FIG. 2 is a configuration diagram illustrating a configuration example of the certificate cache, the certificate store, and the internal counter.

In FIG. 2, a certificate cache 201 is a table to store a counter value of the internal counter when a certificate is referenced and the certificate; the certificate cache 201 stores a CA certificate and a verified EE certificate. An internal counter 202 stores an internal counter value, and is incremented by one at every reference to the certificate. A certificate store 203 is a table to store the CA certificate. Hereinafter, the certificate cache and the certificate store are referred to as a cache and a store, respectively.

Figure 3:
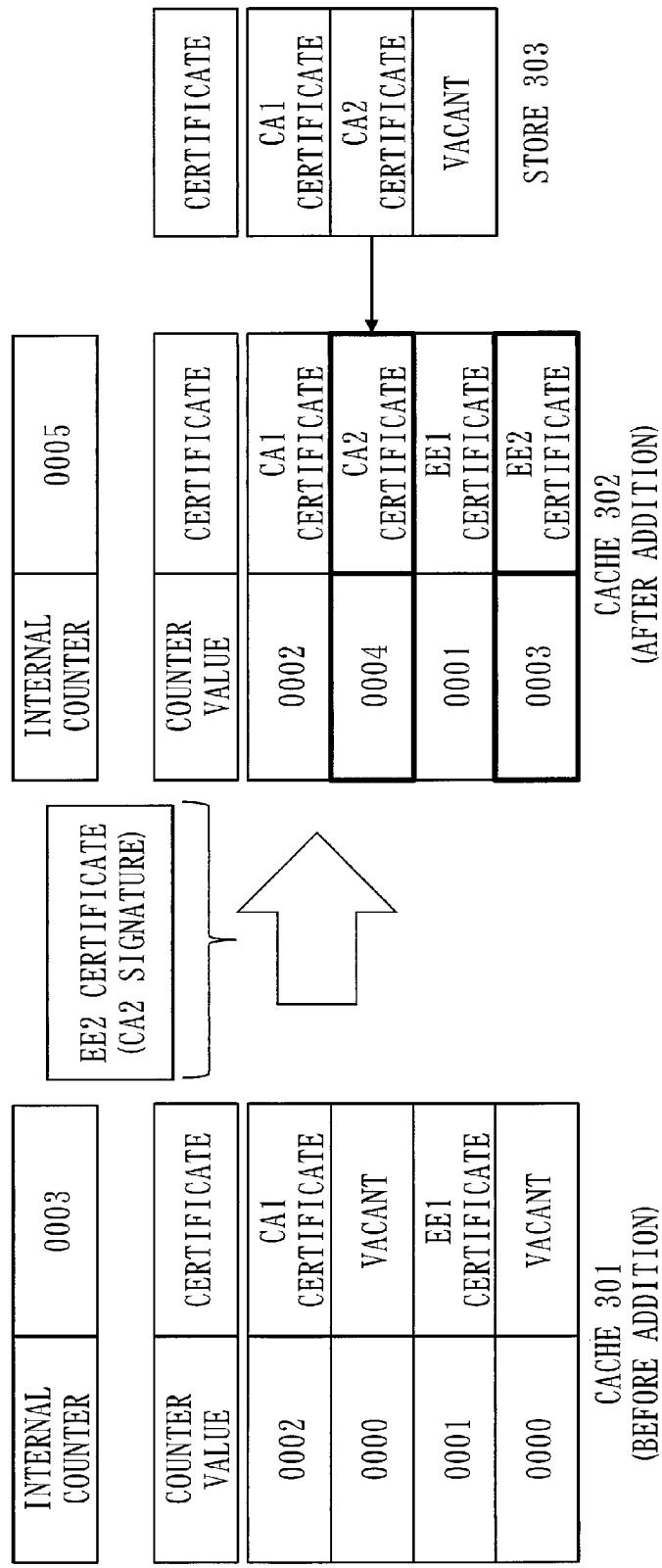
FIG. 3 is a diagram illustrating an operation of the cache and the store when an EE2 certificate is added while the EE2 certificate is not in the cache.

FIG. 3 is a diagram illustrating an operation of the cache and the store when an EE2 certificate is added while the EE2 certificate is not in the cache.

In FIG. 3, it is assumed that the EE2 certificate is signed by a CA2 certificate. When a cache 301 has vacancy before adding, the EE2 certificate and the counter value of the internal counter at that time are added in a vacant area. In a cache 302, the EE2 certificate is added in the final line, and 0003 is added as the counter value of the internal counter at that time. Next, after adding to the cache 302, the counter value of the internal counter is incremented. Further, if the CA2 certificate is not in the cache, the certificate from a store 303 and the counter value of the internal counter at that time are added in the same manner. In the internal count of the cache 302, since the EE2 certificate and the CA2 certificate are added, the count value is 0005 by incrementing twice. Further, if the CA2 certificate is in the cache, only the counter value is updated.

Figure 4:
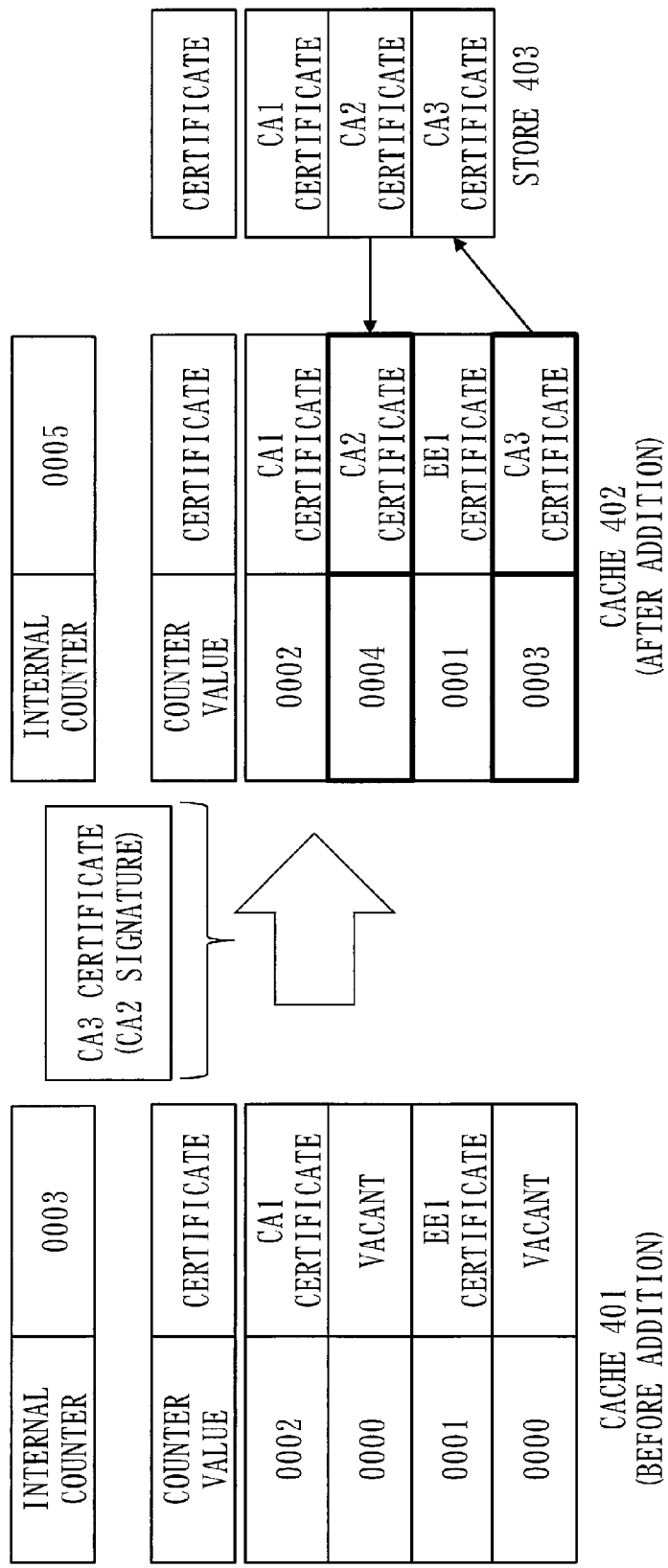
FIG. 4 is a diagram illustrating an operation of the cache and the store when a CA3 certificate signed by a CA2 certificate is added.

FIG. 4 is a diagram illustrating an operation of the cache and the store when a CA3 certificate signed by the CA2 certificate is added.

The operation to the cache is the same as the case of the EE certificate; in case of the CA certificate, the CA3 certificate is added also to the store 403. If the store has no space to write, an error may be returned or an unnecessary CA certificate may be deleted and overwritten.

Figure 5:
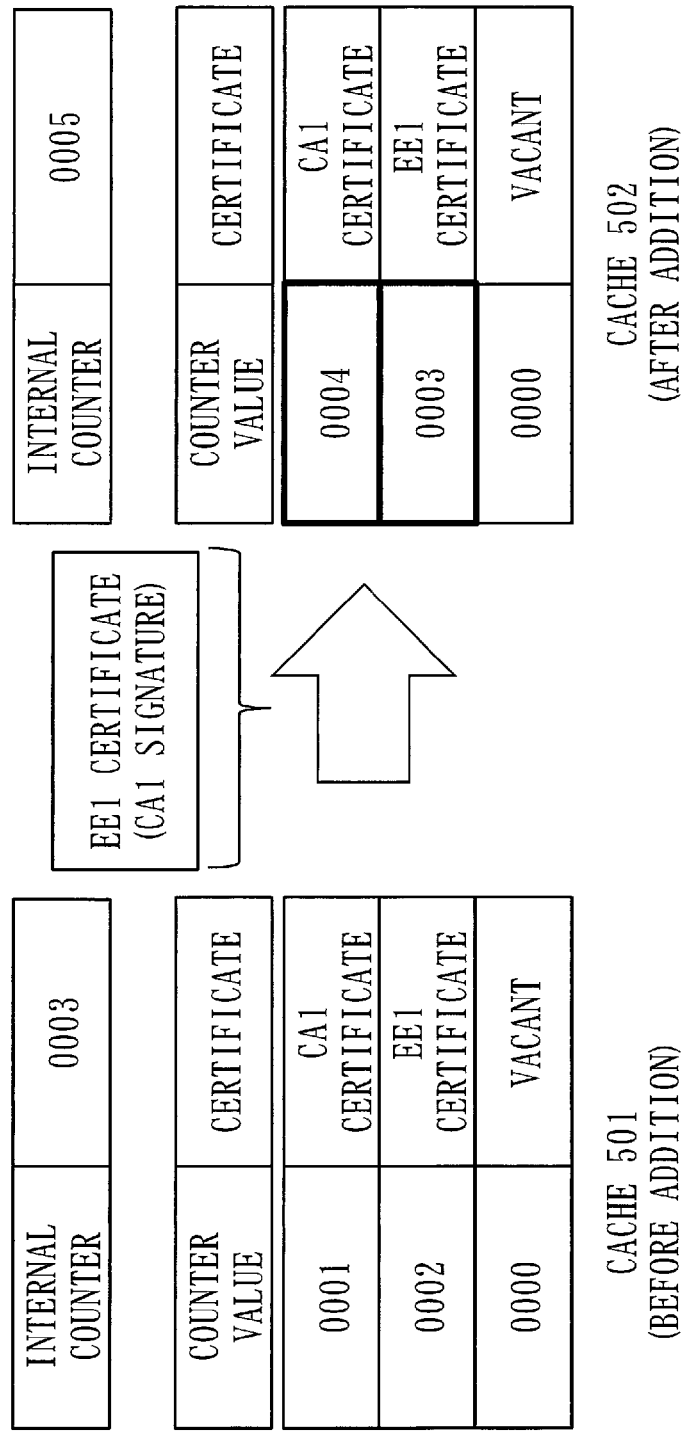
FIG. 5 is a diagram illustrating an operation of the cache and the store when an EE1 certificate is added while the EE1 certificate is in the cache.

FIG. 5 is a diagram illustrating an operation of the cache and the store when an EE1 certificate is added while the EE1 certificate is in the cache.

In FIG. 5, since the EE1 certificate and the CA1 certificate are in a cache 501, only the counter values of the corresponding certificates on the cache are updated.

Figure 6:
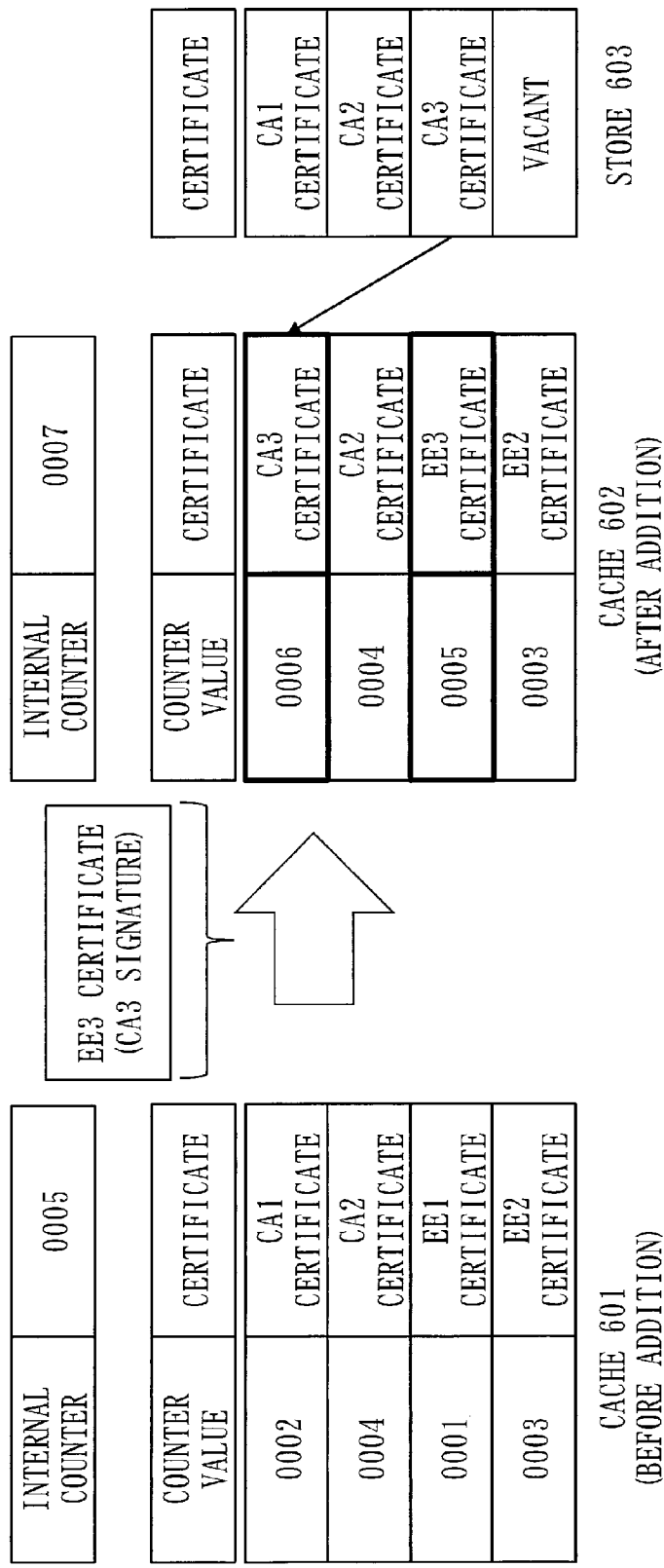
FIG. 6 is a diagram illustrating an operation of the cache and the store when an EE3 certificate is to be added while the cache has no vacancy.

FIG. 6 is a diagram illustrating an operation of the cache and the store when an EE3 certificate is to be added while the cache has no vacancy.

In FIG. 6, it is assumed that the EE3 certificate is signed by the CA3 certificate. First, among certificates stored in a cache 601, an entry having the smallest counter value (the EE1 certificate in FIG. 6) is updated to the EE3 certificate. The internal counter value 0005 at that time is written in a place of the counter value corresponding to the EE3 certificate in the same manner. After the certificate and the counter value are written, the counter value of the internal counter is incremented to 0006. Further, among the certificates stored in the cache 601, an entry having the second smallest counter value (the CA1 certificate in FIG. 6) is updated to the CA3 certificate. The counter value of the cache 602 is updated to 0006 in the same manner. After the update, the value of the internal counter is incremented to 0007.

Here, in the above explanation, the entry having the smallest counter value is updated; however, the update may be implemented when the counter value is equal to or less than a threshold value.

As discussed above, according to the invention of the first embodiment, the counter value of the internal counter is used as the update determination information being information for determining whether or not to update the certificate, the certificate is stored by relating to the counter value, and a priority to update the certificate is decided using the counter value, and thereby an effect that enables to retain the latest referenced certificate, while deleting the oldest referenced certificate, is obtained.

Embodiment 2

In the first embodiment, the counter value of the internal counter is used as the update determination information to decide a priority to update the certificate; in a second embodiment, an embodiment of a certificate management apparatus will be explained, which keeps a ratio of the CA certificates and the EE certificates that are stored in the certificate cache constant, so as to prevent the CA certificate from being deleted excessively.

Figure 7:
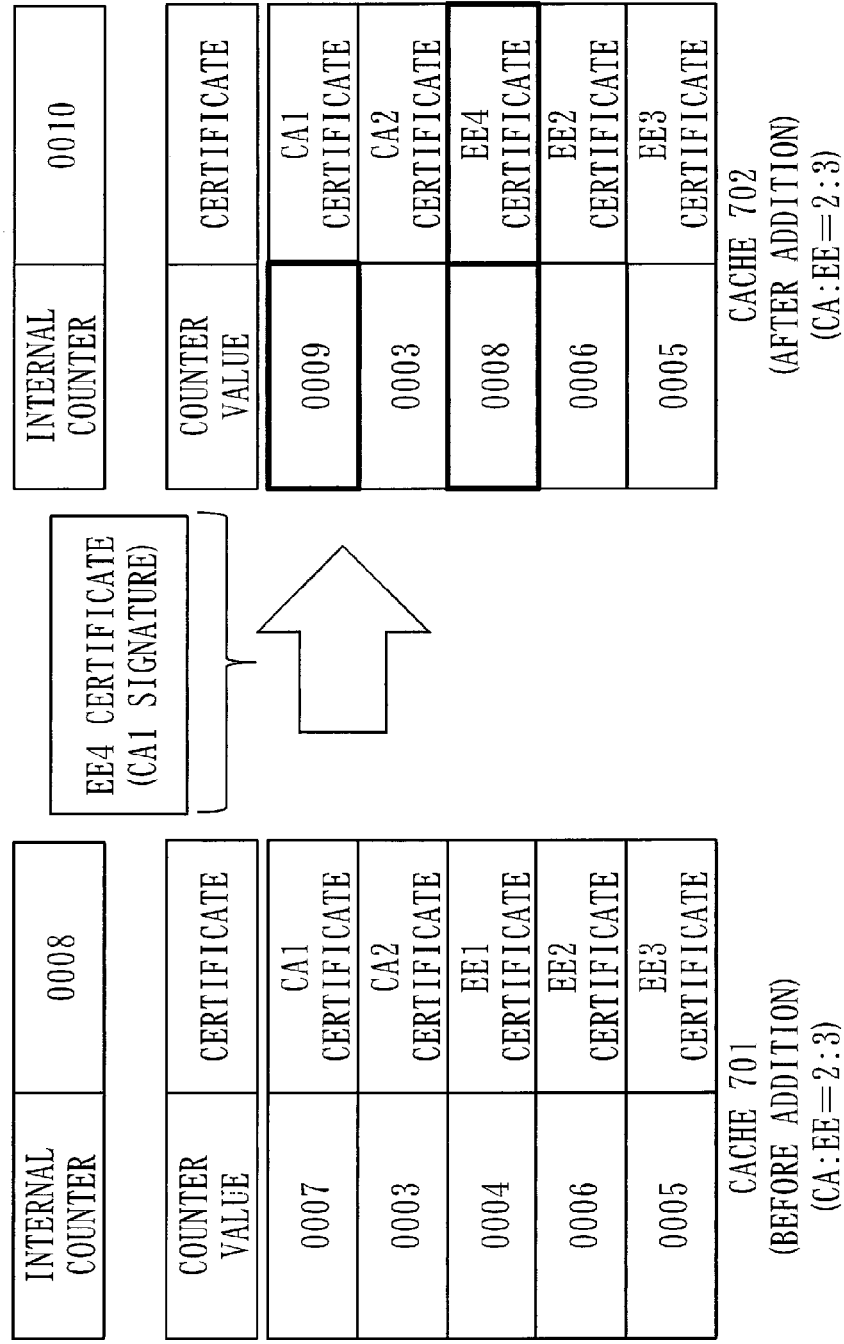
FIG. 7 is a diagram illustrating an operation when an EE4 certificate signed by a CA1 certificate is added.

FIG. 7 is a diagram illustrating an operation when an EE4 certificate signed by the CA1 certificate is added.

FIG. 7 illustrates an example in which a ratio of the CA certificates and the EE certificates that are stored in the cache is 2:3. According to the first embodiment, among the certificates in a cache 701, the CA2 certificate having the smallest value is overwritten by the EE4 certificate; according to the second embodiment, in order to keep the ratio constant, an entry of the EE1 certificate having the smallest value among the EE certificates is overwritten. Further, the value 0008 of the internal counter at that time is written in the same manner. Since the CA1 certificate is already stored in the cache, only the counter value is updated to 0009.

As discussed above, according to the invention of the second embodiment, the ratio of the CA certificates and the EE certificates that are stored is kept constant, and thereby there is an effect that enables to prevent the CA certificate from being excessively deleted. Further, compared with a case in which separate caches are prepared for the CA certificate and the EE certificate, the ratio of the certificates that are stored can be dynamically changed, and thereby there is an effect that enables to keep an appropriate ratio according to the environment of the apparatus.

Embodiment 3

In the third embodiment, anther embodiment will be explained, in which geographic position information is used as update determination information for determining whether or not to update a certificate, and the certificate around a specific position is preferentially retained.

Figure 8:
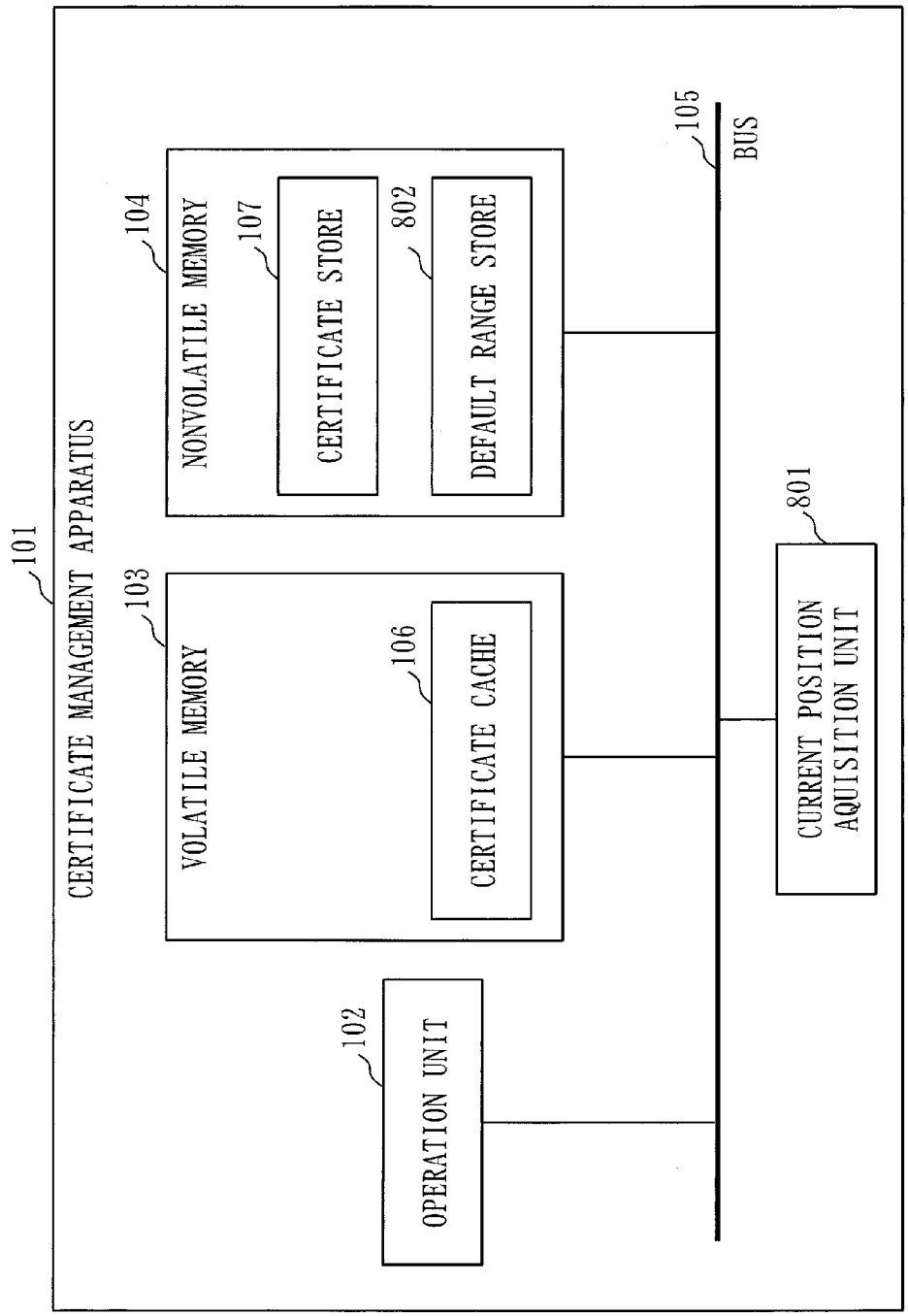
FIG. 8 is a configuration diagram illustrating a configuration example of a certificate management apparatus according to a third embodiment

FIG. 8 is a configuration diagram illustrating a configuration example of a certificate management apparatus according to the third embodiment In FIG. 8, a certificate management apparatus 101 is configured by an operation unit 102, a volatile memory 103, a nonvolatile memory 104, and a current position acquisition unit 801, each connected by the bus 105. The current position acquisition unit 801 is an example of an update determination information output unit. The volatile memory 103 is a memory having a small capacity and being volatile, but capable to be accessed with a high speed; the nonvolatile memory 104 is a memory having a large capacity and low-speed, but is nonvolatile. The current position acquisition unit 801 is a device to acquire position information such as GPS (Global Positioning System) and the like. The volatile memory 103 stores a certificate cache 106. The nonvolatile memory 104 stores a certificate store 107 and a default range store 802. The default range store 802 is an example of a default range memory unit.

Figure 9:
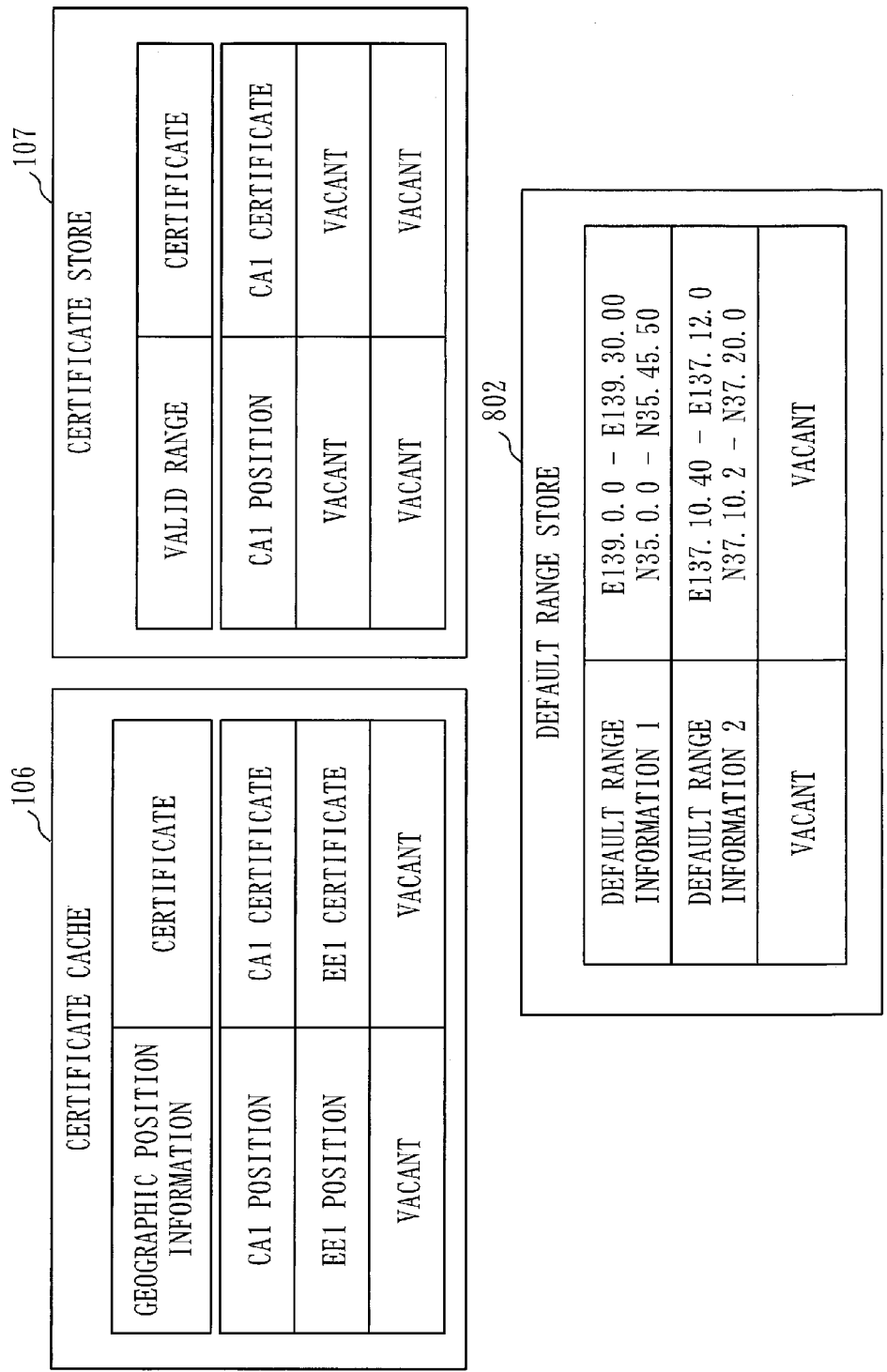
FIG. 9 is a configuration diagram illustrating a configuration example of the certificate cache, the certificate store, and a default range store.

FIG. 9 is a configuration diagram illustrating a configuration example of the certificate cache, the certificate store, and the default range store.

In FIG. 9, the geographic position information and the certificate are recorded in a certificate cache 106. For the geographic position information, if the certificate to be recorded is the CA certificate, a geographic range in which the corresponding certificate is valid is recorded; and in case of the EE certificate, a geographic position at which the certificate is acquired is recorded.

A certificate store 107 records the CA certificate and a geographic range in which the corresponding certificate is valid. If the valid geographic range is not limited, information indicating that is recorded.

The default range store 802 records a plurality of predetermined geographic ranges. The certificates in the predetermined ranges on the cache are retained preferentially. The describing method for the position and the range may be arbitrary. In an example of FIG. 9, the position is expressed by latitude and longitude, the range is expressed by a rectangular having diagonal lines, each connecting two points of the positions. Hereinafter, the position and the range will be expressed in accordance with the above.

Figure 10:
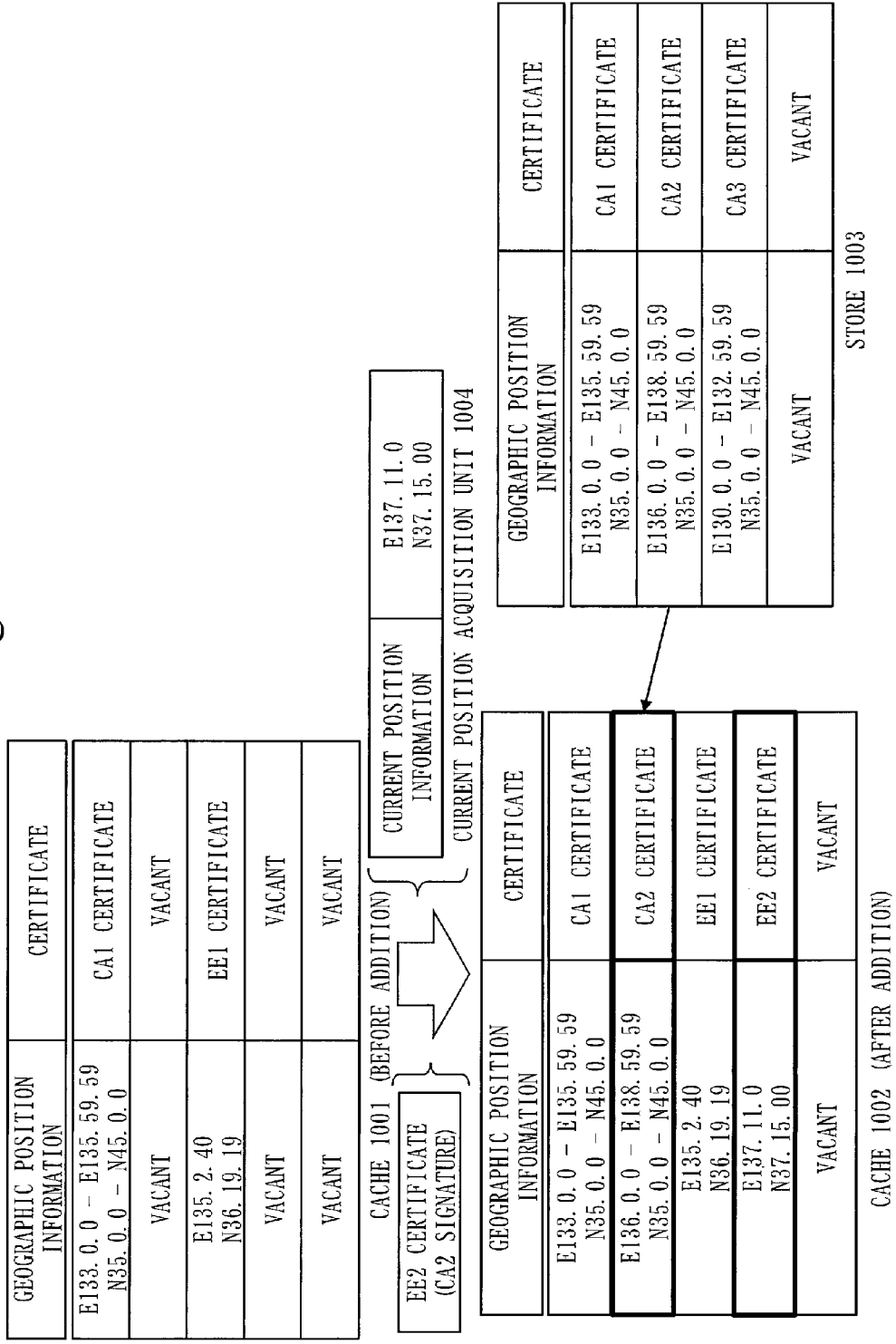
FIG. 10 is a diagram illustrating an operation of the cache and the store when the EE2 certificate is added while the EE2 certificate is not in a cache 1001.

FIG. 10 is a diagram illustrating an operation of the cache and the store when the EE2 certificate is added while the EE2 certificate is not in a cache 1001.

It is assumed that the EE2 certificate is signed by the CA2 certificate. In a case where the cache 1001 has vacancy before adding, the EE2 certificate and the value of the current position at that time are added to a vacant area. Further, the CA2 certificate is not in the cache 1001, the corresponding certificate and the valid range are added from a store 1003 in the same manner. In a case where the CA2 certificate is in the cache, no operation is carried out.

Figure 11:
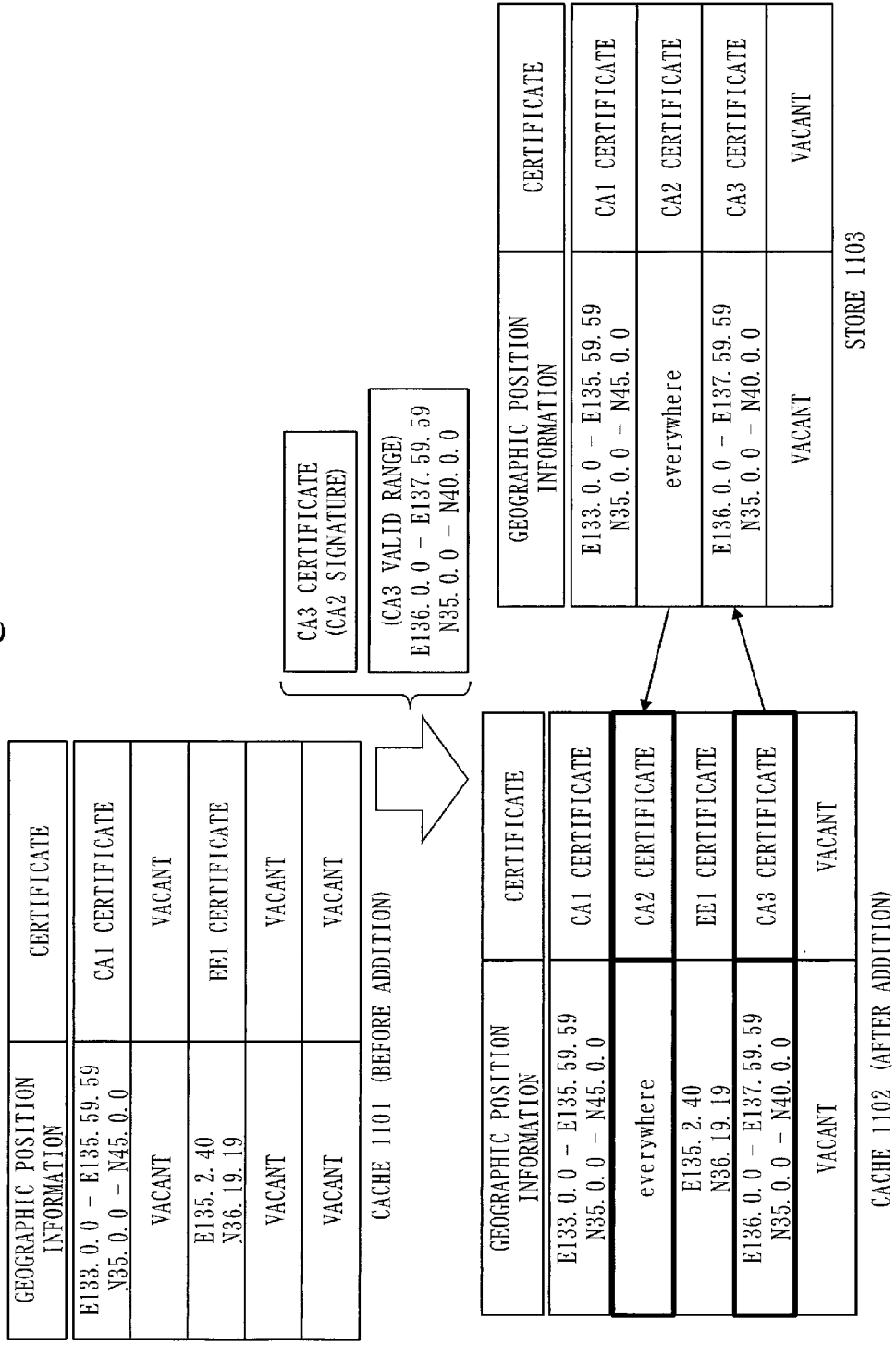
FIG. 11 is a diagram illustrating an operation of the cache and the store when the CA3 certificate signed by the CA2 certificate is added.

FIG. 11 is a diagram illustrating an operation of the cache and the store when the CA3 certificate signed by the CA2 certificate is added.

In a store 1103, the CA2 certificate of which the valid range is "everywhere" is assumed to be a certificate being valid at an arbitrary place. The operation to the cache is the same as the case of the EE certificate; in case of the CA certificate, it is also added to the store. If the store has no vacancy to write, an error may be returned, or an unnecessary CA certificate may be deleted and overwritten. If the valid range of the CA3 certificate is determined, the corresponding valid range is added to a cache 1102 and the store 1103. If no valid range is particularly determined, a valid range of the CA2 certificate being the upper-level certificate may be succeeded.

Figure 12:
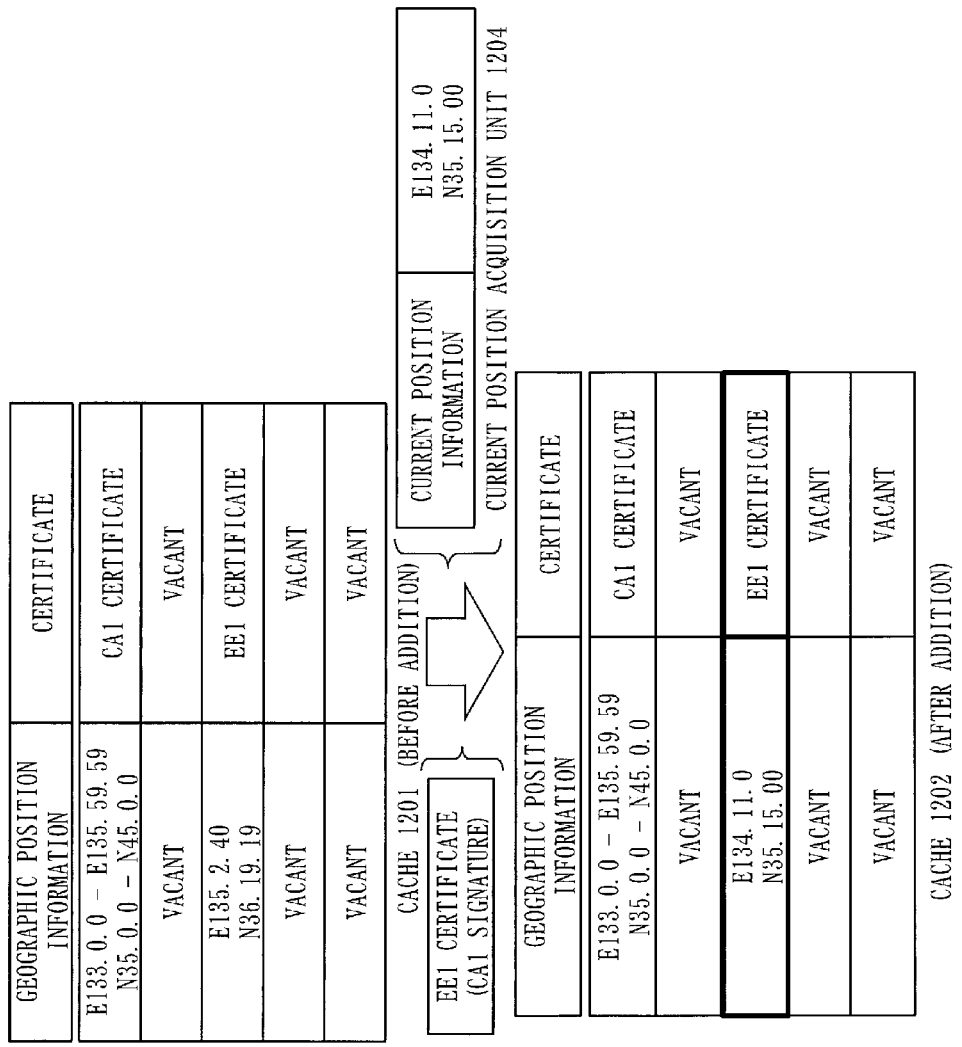
FIG. 12 is a diagram illustrating an operation of the cache and the store when the EE1 certificate is added while the EE1 certificate is in the cache.

FIG. 12 is a diagram illustrating an operation of the cache and the store when the EE1 certificate is added while the EE1 certificate is in the cache.

Since the EE1 certificate and the CA1 certificate are stored in a cache 1201, the position information of the corresponding certificates on the cache are updated to the current positions.

Figure 13:
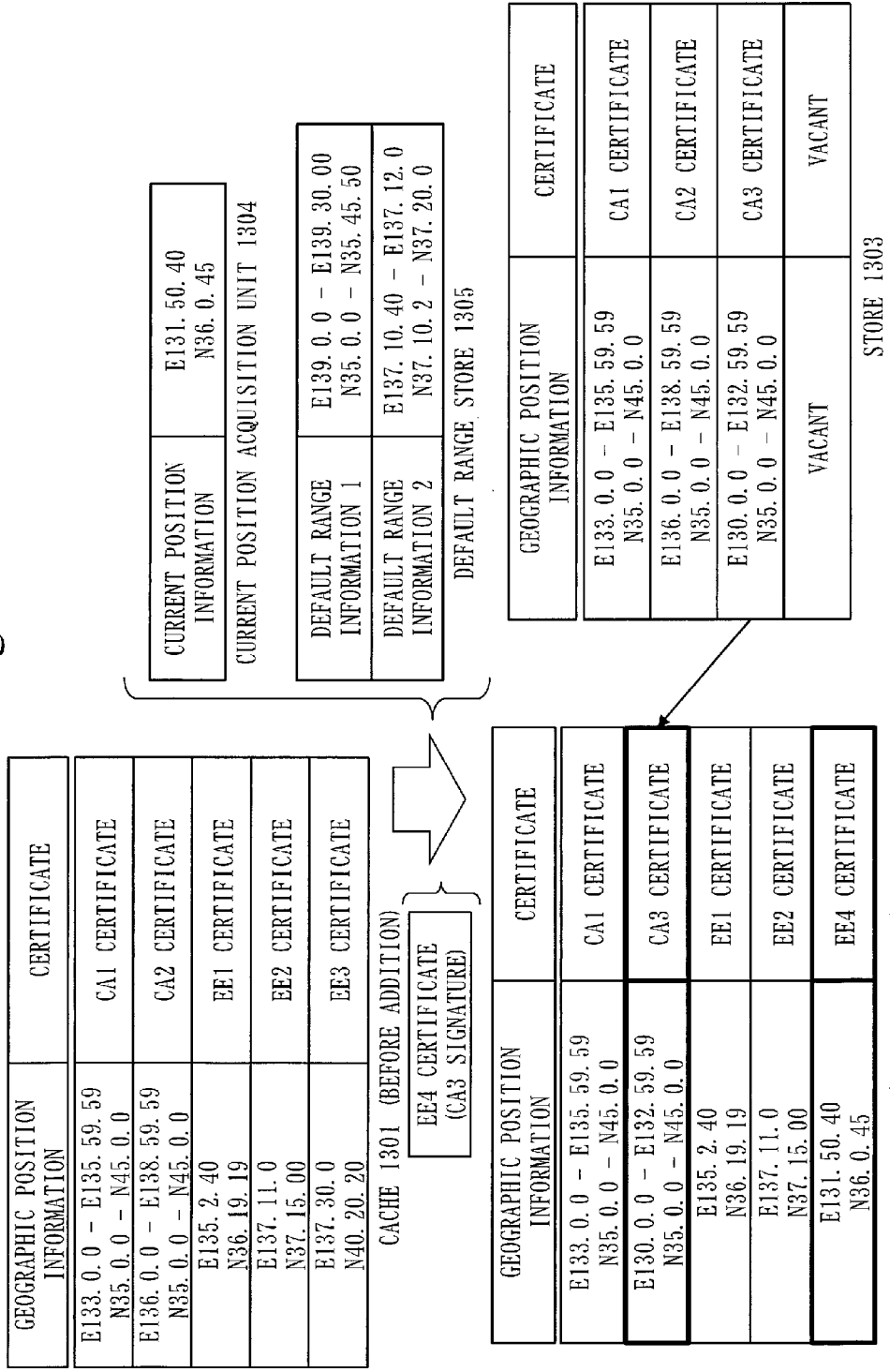
FIG. 13 is a diagram illustrating an operation of the cache and the store when the EE4 certificate is to be added while the cache has no vacancy.

FIG. 13 is a diagram illustrating an operation of the cache and the store when the EE4 certificate is to be added while the cache has no vacancy.

First, a certificate (the EE2 certificate in case of FIG. 13) included in a default range stored in a default range store 1305 is searched. Except for the certificate (the EE2 certificate) which has been matched by the search, among the remaining certificates, a certificate (the EE3 certificate in case of FIG. 13) which is the farthest from the current position is overwritten. Similarly, for the CA certificate, a certificate including a position described in the default range information is retained, and a certificate indicating the farthest range from the current position is overwritten.

Here, in the above explanation, the certificate in the farthest position is overwritten; however, the overwriting may be implemented if a distance from the current position is equal to or greater than a threshold value.

Further, similarly to the second embodiment, a function may be added to select a certificate so as to keep a ratio of the CA certificates and the EE certificates that are stored constant.

As discussed above, the invention of the third embodiment enables to manage the certificates effectively by preferentially deleting the certificate which is the farthest from the current position since such a certificate is referenced the most hardly. In particular, in case of mounting on the automobile, since the current position changes from time to time, an effective certificate management can be implemented. Further, the certificate at a particular position is preferentially retained, and thereby the certificate of the roadside device of, for instance, the commuting route or the neighborhood can be preferentially retained; the certificate management can be implemented effectively.

REFERENCE SIGNS LIST

101: certificate management apparatus; 102: operation unit; 103: volatile memory; 104: nonvolatile memory; 105: bus; 106: certificate cache; 107: certificate store; 108: internal counter; 201: certificate cache (configuration); 202: internal counter (configuration); 203: certificate store (configuration); 801: current position acquisition unit; and 802: default range store.

The invention claimed is:

1. A certificate management apparatus comprising:
a non-volatile memory having stored therein a certificate store and an internal counter;
a volatile memory having stored therein a certificate cache, the certificate cache including a table that stores a counter value and an associated end entity (EE) certificate received from one or more communication apparatuses or an associated certification authority (CA) certificate issued by a predetermined certification authority: and
an operation controller that manages storage of the received EE and CA certificates, the operation controller being configured to:
increment, upon receipt of an EE certificate or a CA certificate referenced in the certificate table, the counter value associated with the referenced certificate in the table;
add, upon receipt an EE certificate not referenced in the table, the received EE certificate and a counter value corresponding to the value of the internal counter to a vacant table entry, if a vacant entry does not exist, the table entry having a counter value equal to or less than a threshold value is replaced with the EE certificate and the counter value corresponding to the value of the internal counter;
add, upon receipt of an EE certificate signed by a certificate authority whose CA certificate is not reference in the table, the CA certificate of the signing certificate and a counter value corresponding to the value of the internal counter to a vacant table entry, if a vacant entry does not exist, the table entry having a counter value equal to or less than a threshold value is replaced with the CA certificate of the signing certificate and a counter value corresponding to the value of the internal counter:
add, upon receipt of an CA certificate not referenced in the table, the received CA certificate to the certificate store and add the received CA certificate and a counter value corresponding to the value of the internal counter to a vacant table entry, if a vacant entry does not exist, the table entry having a counter value equal to or less than a threshold value is replaced with the CA certificate and the counter value corresponding to the value of the internal counter; and
increment the internal counter upon adding or replacing an EE certificate or a CA certificate in the table, wherein the certificate store includes CA certificates issued by a certification authority, and
the operation controller is further configured to
verify a received certificate using a CA certificate stored in the certificate store, and
store, upon adding the verified certificate to the table in the certificate cache, the CA certificate used for verifying the received certificate in the certificate cache table by relating to the counter value.

2. The certificate management apparatus of claim 1, wherein the operation controller is configured to store the CA certificate in the certificate store if the CA certificate is stored in the certificate cache.

3. The certificate management apparatus of claim 1, wherein if a vacant entry does not exist, the table entry having the lowest counter value is selected from the entries whose counter value.

4. The certificate management apparatus of claim 3, wherein if a vacant entry does not exist, the table entry having the lowest counter value is selected from the entries whose deletion maintains a predefined ratio of a number of the EE certificates and a number of the CA certificates stored in the certificate cache.

5. A certificate management apparatus for managing certificates received in a vehicle from a plurality of communication apparatuses, the apparatus comprising:
a current position detector that outputs a current position of the vehicle;
a non-volatile memory having stored therein a certificate store, a certificate cache, the certificate store recording CA certificates and a geographic range in which the corresponding CA certificate is valid;
a volatile memory having stored therein a certificate cache, the certificate cache including a table that stores position information and an associated end entity (EE) certificate received from one of the plurality of communication apparatuses or an associated certification authority (CA) certificate issued by a predetermined certification authority; and
an operation controller that manages storage of the received EE and CA certificates, the operation controller being configured to
store, upon receipt of an EE certificate not referenced in the table, the received EE certificate and the current position of the vehicle in a vacant entry of the table, if a vacant entry does not exist, the operation controller is configured to replace a previous table entry with the received EE certificate using the position information of the table entries as a basis for selection;
update, upon receipt of an EE certificate referenced in the table, the associated position information with the current position; and
add, upon receipt of a certificate signed by a certificate authority whose CA certificate is not reference in the table, the CA certificate of the signing certificate and a corresponding valid range to a vacant table entry, if a vacant entry does not exist, the operation controller is configured to replace a previous table entry with the CA certificate using the position information of the table entries as a basis for selection,
wherein if a vacant entry does not exist, the operation controller is configured to select as the entry to replace an EE certificate or CA certificate whose corresponding position information is a distance from the current position of the vehicle equal to or greater than a threshold value.

6. The certificate management apparatus of claim 5, wherein when a CA certificate is stored in the certificate cache table, the operation controller is further configured to also store the CA certificate in the certificate store.

7. The certificate management apparatus of claim 5, further comprising:
a default range store that stores a default range indicating a default geographic range,
wherein, in a case where the current position or the valid range information stored in an entry of the certificate cache table is within the default range stored in the default range store, the operation controller excludes the entry from the selection process.

8. The certificate management apparatus of claim 5, wherein if a vacant entry does not exist, the operation controller selects as the entry to be replaced, the certificate that maintains a predefined ratio of a number of the EE certificates and a number of the CA certificates stored in the certificate cache.

9. A certificate management method of a certificate management apparatus managing a certificate, the method comprising:
receiving end entity (EE) certificates or certification authority (CA) certificates from a plurality of communication apparatuses;
incrementing, upon receipt of an EE certificate or a CA certificate referenced in a table in a certificate cache stored in a volatile memory, a counter value associated with the referenced certificate in the table;
adding, upon receipt an EE certificate not referenced in the table, the received EE certificate and a counter value corresponding to the value of the internal counter to a vacant table entry, if a vacant entry does not exist, the table entry having a counter value equal to or less than a threshold value is replaced with the EE certificate and the counter value corresponding to the value of the internal counter;
adding, upon receipt of an EE certificate signed by a certificate authority whose CA certificate is not reference in the table, the CA certificate of the signing certificate and a counter value corresponding to the value of the internal counter to a vacant table entry, if a vacant entry does not exist, the table entry having a counter value equal to or less than a threshold value is replaced with the CA certificate of the signing certificate and a counter value corresponding to the value of the internal counter;
adding, upon receipt of an CA certificate not referenced in the table, the received CA certificate to a certificate store in a non-volatile memory and add the received CA certificate and a counter value corresponding to the value of the internal counter to a vacant table entry, if a vacant entry does not exist, the table entry having a counter value equal to or less than a threshold value is replaced with the CA certificate and the counter value corresponding to the value of the internal counter; and
incrementing a counter value of an internal counter stored in the non-volatile memory upon adding or replacing an EE certificate or a CA certificate in the table of the certificate cache,
wherein the certificate store includes CA certificates issued by a certification authority, and
verifying, by an operation controller, a received certificate using a CA certificate stored in the certificate store, and
storing, upon adding the verified certificate to the table in the certificate cache, the CA certificate used for verifying the received certificate in the certificate cache table by relating to the counter value.

10. A certificate management method of a certificate for managing certificates received in a vehicle from a plurality of communication apparatuses, the method comprising:
receiving, from a position detector, a current position of the vehicle;
storing, in a non-volatile memory, a certificate store, the certificate store recording CA certificates and a geographic range in which the corresponding CA certificate is valid;
storing, in a volatile memory, a certificate cache, the certificate cache including a table that stores position information and an associated end entity (EE) certificate received from one of the plurality of communication apparatuses or an associated certification authority (CA) certificate issued by a predetermined certification authority;
storing, upon receipt of an EE certificate not referenced in the table, the received EE certificate and the current position of the vehicle in a vacant entry of the table, if a vacant entry does not exist, replacing a previous table entry with the received EE certificate using the position information of the table entries as a basis for selection;
updating, upon receipt of an EE certificate referenced in the table, the associated position information with the current position; and
adding, upon receipt of a certificate signed by a certificate authority whose CA certificate is not reference in the table, the CA certificate of the signing certificate and a corresponding valid range to a vacant table entry, if a vacant entry does not exist, replacing a previous table entry with the CA certificate using the position information of the table entries as a basis for selection,
selecting, by an operation controller, if a vacant entry does not exist, the entry to replace an EE certificate or CA certificate whose corresponding position information is a distance from the current position of the vehicle equal to or greater than a threshold value.

* * * * *